United States Patent
Yang et al.

(10) Patent No.: US 9,950,358 B2
(45) Date of Patent: Apr. 24, 2018

(54) COMPOSITIONS FOR CORES USED IN INVESTMENT CASTING

(71) Applicant: GENERAL ELECTRIC COMPANY, Schenectady, NY (US)

(72) Inventors: Xi Yang, Mason, OH (US); John Thomas Leman, Schenectady, NY (US); Anthony Yu-Chung Ku, Rexford, NY (US); Tao Li, Blue Ash, OH (US); John Pollinger, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 251 days.

(21) Appl. No.: 14/945,602

(22) Filed: Nov. 19, 2015

(65) Prior Publication Data
US 2017/0144216 A1    May 25, 2017

(51) Int. Cl.
*B22C 9/10* (2006.01)
*C04B 35/10* (2006.01)

(52) U.S. Cl.
CPC ............... *B22C 9/10* (2013.01); *C04B 35/10* (2013.01)

(58) Field of Classification Search
CPC ........................................................ B22C 9/10
USPC .......................... 164/369, 516–529
See application file for complete search history.

(56) References Cited

U.S. PATENT DOCUMENTS

| | | |
|---|---|---|
| 2,641,044 A | 6/1953 | Bearer |
| 3,108,985 A | 10/1963 | Weyer |
| 3,126,357 A | 3/1964 | Liebig |
| 3,445,250 A | 5/1969 | Preece |
| 4,026,344 A | 5/1977 | Greskovich |
| 4,093,017 A | 6/1978 | Miller, Jr. et al. |
| 4,247,333 A | 1/1981 | Ledder et al. |
| 4,703,806 A | 11/1987 | Lassow et al. |
| 4,837,187 A | 6/1989 | Frank et al. |
| 4,966,225 A | 10/1990 | Johnson et al. |
| 5,332,537 A | 7/1994 | Hens et al. |
| 5,394,933 A | 3/1995 | Takayanagi |
| 5,409,871 A | 4/1995 | Dodds et al. |
| 5,580,837 A | 12/1996 | Dodds et al. |
| 5,660,524 A | 8/1997 | Lee et al. |
| 6,036,441 A | 3/2000 | Manning et al. |
| 6,168,381 B1 | 1/2001 | Reddy |
| 6,595,748 B2 | 7/2003 | Flodman et al. |
| 6,832,889 B1 | 12/2004 | Lee et al. |
| 6,929,054 B2 | 8/2005 | Beals et al. |
| 7,287,573 B2 | 10/2007 | McNulty et al. |
| 7,413,001 B2 | 8/2008 | Wang et al. |
| 7,487,819 B2 | 2/2009 | Wang et al. |
| 7,798,201 B2 | 9/2010 | Bewlay et al. |
| 2004/0166243 A1* | 8/2004 | Inglefield ................. B22C 9/00 427/387 |
| 2005/0252631 A1 | 11/2005 | Bardes et al. |
| 2008/0078520 A1* | 4/2008 | Bewlay ..................... B22C 9/04 164/28 |
| 2014/0182809 A1 | 7/2014 | Bochiechio |
| 2014/0238632 A1 | 8/2014 | Yang et al. |
| 2015/0306657 A1 | 10/2015 | Frank |

FOREIGN PATENT DOCUMENTS

| | | |
|---|---|---|
| CN | 101372421 A | 2/2009 |
| EP | 1 852 405 A2 | 11/2007 |
| EP | 1 930 095 A2 | 6/2008 |
| EP | 3 048 088 A1 | 7/2016 |

OTHER PUBLICATIONS

Extended European Search Report and Opinion issued in connection with corresponding EP Application No. 16199374.6 dated Mar. 24, 2017.
Suttor, et al; "Formation of Mullite from Filled Siloxanes," Journal of the American Ceramic Society, 1997, pp. 2541-2548, vol. 80, issue 10.
Michalet, et al; "Formation at low temperature with low shrinkage of polymer/Al/Al2O3 derived mullite," Ceramic International, 2001, pp. 315-319, vol. 27.
Michalet, et al; "Elaboration of low shrinkage mullite by active filler controlled pyrolysis of siloxanes," Journal of the European Ceramic Society, 2002, pp. 143-152, vol. 22.
Anggono, et al; "Mullite formation from the pyrolysis of aluminum-loaded polymethylsilsoxanes: The influence of aluminum powder characteristics," Journal of the European Ceramic Society, 2006, pp. 1107-1119, vol. 26.

* cited by examiner

*Primary Examiner* — Kevin E Yoon
(74) *Attorney, Agent, or Firm* — John P. Darling

(57) ABSTRACT

The present disclosure generally relates to a ceramic core comprising predominantly mullite, which is derived from a precursor comprising alumina particles and siloxane binders. Free silica is present in the ceramic body, but is largely unavailable for reaction with metal alloys used in investment casting. Methods of making cast metal articles are also disclosed.

20 Claims, 10 Drawing Sheets

Sample 1B

Sample 2B

Sample 3B

Sample 4

COMPOSITIONS FOR CORES USED IN INVESTMENT CASTING

TECHNICAL FIELD

The present disclosure generally relates to compositions for investment casting cores and methods for making them. In some specific embodiments, the present disclosure relates to cores comprising alumina, silica, mullite, and, in some instances, an oxide on the surface of the core.

BACKGROUND

Investment casting often utilizes cores to produce internal channels inside cast metals. A molten metal or alloy is poured into a mold containing a core. After the metal solidifies, the core is removed to leave behind the internal channels. The architecture of the internal channels is determined by the features of the core.

Cores formed through injection molding and other conventional processes can produce simple hollow channel architectures. However in some applications, such as cast blades for gas turbines, more complex channel geometries are desirable due to their improved blade performance, where air is blown through the hollow channels of the cast blade for cooling. Improved blade cooling performance can take the form of reduced cooling air flow, which allows for increased utilization of air for combustion and thus increases engine thrust. Higher blade cooling performance allows for an increase in combustor operating temperature and improved thermodynamic efficiency, resulting in better specific fuel consumption, while still maintaining turbine blade component temperatures within an acceptable range for durability. Especially useful channel geometries for turbine blade cooling circuits are described in, for instance, U.S. Pat. No. 5,660,524, U.S. Pat. No. 6,036,441, U.S. Pat. No. 6,168,381, U.S. Pat. No. 6,595,748 and U.S. Pat. No. 6,832,889. A major limitation to commercial implementation of these representative cooling circuits in turbine blades is the inability to produce the necessary ceramic cores as 1-piece articles by conventional molding techniques. Examination of the cooling circuit geometries of interest shows that there exists no single parting line allowing the construction of separable mold halves to enable removal of a molded part without destroying part of the formed structure. Accordingly, production of cores to produce such sophisticated cooling circuits requires elaborate multi-step processes where the geometry is broken up into several moldable sections, each with its own separate mold tooling. The individual molded sections are then assembled after molding and firing, with a concomitant reduction in core yield for precision investment casting, due to the loss of registry between the parts. The multi-piece process is also much more expensive due to the capital cost of multiple mold tools, the hand work needed for core finishing and assembly, and the further reduction in net casting yield, due to the poorer dimensional tolerances and mechanical stability during casting of the multi-piece core assembly.

One way to produce cores with both simple and complex channel architectures is with disposable core dies (DCD) described in, for instance, U.S. Pat. No. 7,487,819. The core is formed by injecting a slurry containing ceramic particles and an organic binder into a disposable core die. The slurry is then cured and then fired to produce a solidified ceramic core. The disposable core die can be removed before or during or after the core firing process, for instance by a chemical, thermal or mechanical process.

Ceramic core materials used in the investment casting industry are often made predominately of silica ($SiO_2$). Silica is a commonly used core material in investment casting because of its low coefficient of thermal expansion, high-temperature dimensional stability, and its ease of removal from the casting. Articles made by investment casting are cast metal or metal alloys. In some instances, this metal may react with the conventional silica-based ceramic core. Therefore, the use of silica-containing core materials for casting of reactive metals is known to be problematic, as silica may react with certain metals during the casting process.

Yttrium addition to an alloy is one approach for improving the oxidation resistance of nickel-based superalloys at the service temperature of turbine airfoils. However, yttrium can react with silica during casting, leading to depletion of the yttrium in the alloy and introducing components into the alloy that debit the mechanical properties. This is a major limitation in using silica cores for the casting of these (reactive) nickel-based superalloys.

Alumina and yttria materials have been used in casting to reduce or eliminate this reactivity problem. Alumina, for instance, is less reactive than silica. However, alumina is harder to process than silica materials with respect to higher temperatures required for processing. This introduces problems with dimensional tolerances because of the higher coefficient of thermal expansion relative to silica. Alumina cores can also require more extreme leaching conditions for their removal after casting because of their lower solubility and/or leach rates. These constraints apply equally to ceramic cores formed through conventional methods such as injection molding, as well as those formed by the DCD process.

Alumina core compositions of the prior art useful for casting reactive alloys, such as U.S. Pat. No. 4,837,187 and U.S. Pat. No. 5,409,871 and U.S. Pat. No. 5,580,837, are known, and consist of alumina and other ceramic additives in a thermoplastic organic polymer binder. The polymer binders are solids at room temperature, and must be mixed at elevated temperatures in the molten state. These compositions are subsequently used in high pressure resin-transfer molding processes, which must also occur at elevated temperatures. The U.S. Pat. No. 4,837,187 employs an ethylene-vinyl acetate polymer and wax mixture that is mixed and molded from 80-125° C. and at 200-1500 psig pressure. The U.S. Pat. Nos. 5,409,871 and 5,580,837 disclose a hydrophilic and a hydrophobic binder-ceramic powder mixture which must be compatibilized by mixing and injecting at 200° C., as described in U.S. Pat. No. 5,332,537. This mixture has a comparatively low viscosity from 5 to 300 Pa-sec, but relies on being heated to this high temperature in order to achieve this viscosity and maintain mixture homogeneity during use. It is not only more costly to run either such process with the energy expenditure to maintain the core mixture and injection process equipment at a temperature greatly elevated above the ambient, but both are also incompatible with the use of fugitive organic polymeric core dies that lose their rigidity above about 60° C. None of these cases teach the formation or use of a low-reactivity or non-reactive core compositions with properties compatible with the DCD process, which are ideally conducted at or about ambient room temperature and at pressures <100 psig.

While the use of $Y_2O_3$ coatings on the opposing side of the metal in shells has been practiced for Y-containing reactive alloys, there does not appear to be any well-practiced art for pure $Y_2O_3$ cores. Further, yttria is not an ideal material for a non-reactive core. The cost of the rare earth oxide versus alumina or silica is much higher (>10×). Yttria has lower core strength due to the lower bulk modulus as compared to alumina. Yttria also shows poor leaching in conventional pressurized autoclaves with strong aqueous caustic solutions. Additionally, yttria shows a high thermal expansion, with a CTE of 7 ppm (as does alumina).

Bochiechio (US 2014/0182809) teaches the use of mullite- and metallic-containing cores for investment casting. US 2014/0182809 is focused on the use of these compositions to closely match the coefficient of thermal expansion of the ceramic material to a refractory metal component, and does not teach the casting of reactive alloys with these compositions. To the contrary, its allowance of up to 60 wt % silica indicates to one of ordinary skill in the art that the castings of reactive alloys are not envisioned. The present disclosure uses cores that are suitable for casting of reactive alloys, in stark contrast to Bochiechio.

Therefore, there is a need for a low reactivity material system compatible with DCD processing for producing cores that can generate cast articles with complex internal channel architectures made using reactive metals and alloys.

BRIEF DESCRIPTION

The present disclosure provides, in a first aspect, a method for producing a ceramic core for investment casting of reactive metal. This method includes injecting a slurry comprising alumina particles and a siloxane binder mixture into a die; and thermally converting the slurry into a ceramic core. The ceramic core includes mullite, alumina, and up to 11 wt % free silica.

The present disclosure provides, in a second aspect, a method of making a cast metal article. The method includes bringing molten reactive metal into contact with a ceramic core comprising mullite, alumina, and up to 11 wt % free silica. In some embodiments, the ceramic core has an oxide on substantially its entire surface. The oxide has a normalized Gibbs free energy of formation that is less than the normalized Gibbs free energy of formation for silica. The reactive metal is then solidified.

The present disclosure provides, in a third aspect, a ceramic core formed by mixing a siloxane binder and alumina particles to form a slurry, and converting the slurry comprising alumina particles and a siloxane binder to mullite by thermal treatment. The ceramic core includes mullite, alumina, and up to 11 wt % free silica. In some embodiments, the ceramic core has an oxide on substantially its entire surface.

The present disclosure provides, in a fourth aspect, a cast metal article formed by bringing molten reactive metal into contact with a ceramic core which includes mullite, alumina, and up to 11 wt % free silica.

The present disclosure provides, in a fifth aspect, a ceramic core which includes mullite, alumina, and up to 11 wt % free silica, and an oxide disposed on the surface of the ceramic core.

These and other objects, features and advantages of this disclosure will become apparent from the following detailed description of the various aspects of the disclosure taken in conjunction with the accompanying drawings.

DRAWINGS

DETAILED DESCRIPTION

Figure 1:
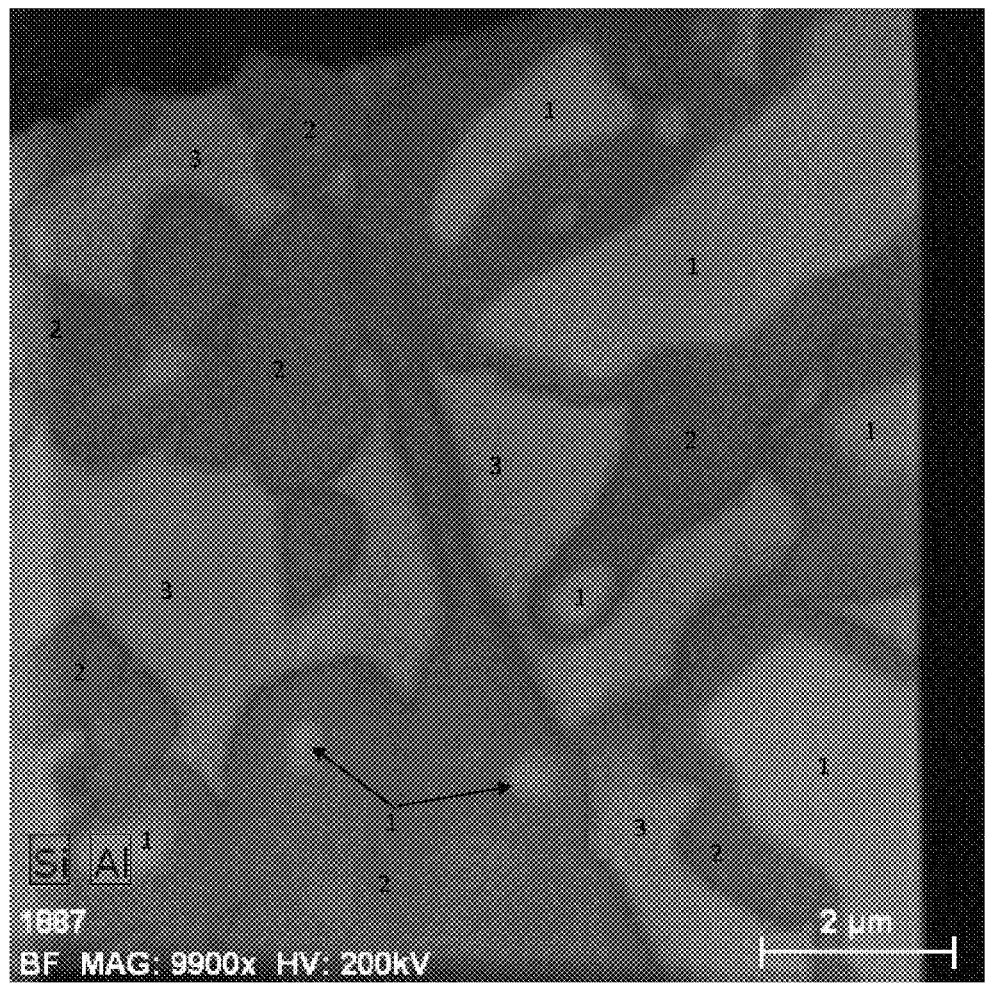
FIG. 1 is a transmission electron microscopy (TEM) bright field image with elemental analysis by electron energy loss spectroscopy (EELS) of one embodiment of a ceramic core described herein.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The description of the disposable core die and the casting process found in U.S. Pat. No. 7,487,819 is incorporated herein. A process is needed for forming a ceramic core which has compatibility with the DCD process, is substantially non-reactive during casting, and allows for the production of structures with intricate internal shapes while possessing the compatibility with the alloy sought for articles formed by investment casting. In summary, the ceramic core should meet the following criteria:

1) Is formed from a slurry with low enough viscosity to allow for low-pressure injection molding in thin-wall disposable plastic molds without bursting or bloating;
2) Is formed from a slurry that has a high enough viscosity and yield stress to allow for handling and fabricating the part after injection, without excessive settling that leads to inhomogeneity of ceramic content, differential shrinkage, and the like;

3) Has adequate strength in its green state and low enough shrinkage during curing and firing to be producible in good dimensional tolerance yield; and 4) Satisfies all the property requirements of the fired body that are necessary, such as room temperature strength for handling, high temperature strength and creep resistance for casting, low enough density (i.e., sufficient porosity) to limit compressive strength to avoid hot cracking and metal recrystallization, and allow effective leaching in a practical time period under practical temperature and pressure conditions.

The compositions of the present disclosure are useful in the context of conventional core making for investment casting (or any other near-net shape high temperature ceramic fabricated part) for the reasons as taught by U.S. Pat. No. 7,287,573, that is, low molding shrinkage, strong green part, easy ejection from a mold, and no need for porous mold tooling or special drying procedures after molding. The present invention is also useful in light of other fabrication techniques, such as those described in U.S. Pat. No. 7,413,001, in that it allows for making these lesser reactivity ceramic compositions in the form of geometrically complex cooling circuits in fugitive polymer mold tooling, which must be done under low pressures and near room temperature in order not to burst or distort the mold tooling. The present disclosure is also useful in the context of the disposable core die and the casting process found in U.S. Pat. No. 7,487,819.

While a composition as detailed herein containing alumina powders and a (room-temperature) liquid siloxane binder was readily made as a low-viscosity slurry, and was room temperature injectable at low pressures into disposable tooling, the liquid phase binder was known to form amorphous silica on firing. Subsequent firing can convert this to crystalline silica, and extended firing at higher temperatures and times lead to conversion to mullite. Significant scientific effort has focused on improving the conversion of the silica-alumina system to mullite (Suttor, Kleebe, and Zeigler, J. Am. Cer. Soc. 80, 2541, 1997) and lowering the temperature at which conversion begins (Michalet et al, Cer. Int 27, 315, 2001). While mullite has been previously identified as a shell material for investment casting (U.S. Pat. No. 4,966,225), systems containing free silica are not expected to be compatible with reactive alloys under investment casting conditions. Based on the known reactivity of silica with yttrium-bearing alloys, and further the possibility of incompleteness of the reaction of alumina plus silica to form mullite, it was unexpected that a core made using this system containing detectable amounts of free silica would show low enough reactivity to yttrium-bearing alloys during casting.

The terms "low reactivity" and "non-reactivity" (or "non-reactive") may be used interchangeably in this disclosure. Low reactivity relates to a property of the core wherein upon casting, the core-metal reaction is sufficiently low that the mechanical properties of the cast article are not adversely affected.

The disclosure relates to a ceramic core used in investment casting of reactive alloys. This core is a structure containing mullite, alumina, and silica, wherein much of the free silica is encapsulated within a mullite shell. The core includes mullite derived from a precursor slurry that includes alumina particles and a siloxane binder. This precursor slurry retains the processing advantages of a silica powder—siloxane binder system. A thermal treatment is used to convert most of the silica generated by the siloxane binder to mullite by reaction with alumina. Free $Al_2O_3$ and other minor constituents may also be present.

One concern when using this approach is the need to fully react silica into mullite to prevent residual free silica from reacting with the reactive metal during casting. The present disclosure addresses this issue and allows the use of siloxane binders in the processing of core material by sequestering most of the free silica within a shell of material (mullite) that prevents it from appreciably reacting with a reactive metal during investment casting. Because of this, the presence of small amounts of unreacted free silica is allowable in the core. These amounts are insufficient to produce a continuous silica phase on the surface of grains of any other phase present, that would then allow direct contact with molten alloy. This microstructure comprising mullite derived from alumina and silica, but containing unreacted silica, significantly reduces the metal alloy's access to and reactivity with any silica during the casting process.

In one aspect, the disclosure relates to a method for producing a ceramic core for investment casting of reactive materials, such as reactive metal. The resulting castings may have intricate geometries, such as those used for (but not limited to) internal cooling of hollow airfoils for gas turbine engines. This method includes obtaining a slurry comprising alumina particles and a siloxane binder. The alumina particles can be tailored to make the desired blend with the siloxane binder. For instance, various measured particle sizes and morphologies of alumina may be mixed together in certain ratios to obtain specific slurry characteristics. The particle size may be described by the ceramic industry practice of citing the D50 value in microns (particle size volume median value). In some embodiments, the D50 size is up to 150 microns. In some embodiments, the D50 size is up to 100 microns or is up to 50 microns. In other embodiments, the D50 size range is between 1 and 150 microns. In still other embodiments, the D50 size range is between 3 and 150 microns. In yet other embodiments, the D50 size range is between 1 and 50 microns, between 3 and 50 microns, between 1 and 100 microns, or between 3 and 100 microns.

The overall final stoichiometry of the system should not be on the silica-rich side of the (3:2) mullite phase boundary, but should yield a final system that is mullite or mullite plus alumina (i.e., that is not silica rich). The slurry composition should conform to those limits when fired, based on a calculation of silica yield from the amount of siloxane in the slurry and the specific char yield of the given siloxane mixture. In some embodiments, the wt % of alumina in the slurry relative to the total alumina+siloxanes is between 67.6 wt % and 90 wt %. In some embodiments, the wt % of alumina in the slurry relative to the total alumina+siloxanes is between 75 wt % and 90 wt %. In other embodiments, the wt % of alumina in the slurry relative to the total alumina+siloxanes is between 80 wt % and 90 wt %. In still other embodiments, the wt % of alumina in the slurry relative to the total alumina+siloxanes is between 75 wt % and 85 wt %. In some embodiments, the wt % of alumina in the slurry relative to the total alumina+siloxanes is between 80 wt % and 85 wt %. In other embodiments, the wt % of alumina in the slurry relative to the total alumina+siloxanes is between 82 wt % and 88 wt %. In other embodiments, the wt % of alumina in the slurry relative to the total alumina+siloxanes is between 70 wt % and 80 wt %. In still other embodiments, the wt % of alumina in the slurry relative to the total alumina+siloxanes is between 70 wt % and 75 wt %.

Various siloxane binders may be utilized that provide for the desired characteristics of the resulting slurry. The term "siloxane binder" as used herein includes both single component binders and mixtures of more than one binder. The use of either a single component or a mixture of components for the binder allows for tailoring of various features, such as viscosity or silica yield. The composition is typically a slurry that includes ceramic powders dispersed within a silicon-bearing liquid; the liquid may also be referred to as a "binder" in the parlance of slurry techniques. In particular, the liquid includes a siloxane species, for instance, (a) one or more siloxane polymers—such as (but not limited to) the so-called "Room Temperature Vulcanizable," (RTV) systems well known in the silicones art, including as an example RTV 615 (trade name of Momentive Performance Materials), as well as other such silicone formulations that contain polymeric inputs; (b) siloxane monomers; and/or (c) siloxane oligomers. The siloxane species may include alkenyl and hydride functionalities. The siloxane species used in the liquid is of a type referred to in the art as "curable" or "reactive," meaning that under a given set of processing conditions, the species will undergo a cross-linking ("curing") reaction.

The siloxane species having alkenyl functionalities that may be used as a binder liquid in the composition described herein are alkenyl siloxanes of the general formula (I):

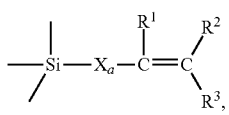

(I)

wherein $R^1$, $R^2$, and $R^3$ each independently comprise hydrogen or a monovalent hydrocarbon, halocarbon, or halogenated hydrocarbon radical; X a divalent hydrocarbon radical; and a is a whole number having a value between 0 and 8, inclusive. The terms "monovalent hydrocarbon radical" and "divalent hydrocarbon radical" as used herein are intended to designate straight chain alkyl, branched alkyl, aryl, aralkyl, cycloalkyl, and bicycloalkyl radicals.

The siloxane species that include hydride functionalities are hydrosiloxanes having hydrogen directly bonded to one or more of the silicon atoms, and therefore contain a reactive Si—H functional group.

Examples of alkenyl siloxanes useful in the present disclosure include polyfunctional olefinic substituted siloxanes of the following types:

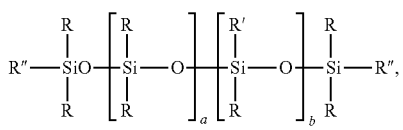

(II)

wherein R is a monovalent hydrocarbon, halocarbon, or halogenated hydrocarbon; and R' is an alkenyl radical such as vinyl, or other terminal olefinic group such as allyl, 1-butenyl, and the like. R" may include R or R', a=0 to 200, inclusive, and b=1 to 80, inclusive, wherein a and b are selected to provide a fluid with maximum viscosity of about 1,000 centistokes, and such that the ratio of b/a allows for at least three reactive olefinic moieties per mole of siloxane of formula (II) above.

Suitable alkyl/alkenyl cyclosiloxanes are of formula (III):

[RR'SiO]x, (III)

wherein R and R' are as previously defined, and x is an integer 3 to 18 inclusive.

Other suitable functional unsaturated siloxanes may be of the formula (IV):

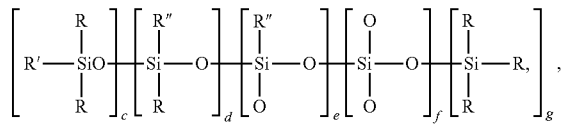

(IV)

wherein R, R', and R" are as previously defined. In some embodiments, the ratio of the sum of (c+d+e+g)/f is ≥2.

Examples of unsaturated siloxanes include 1,3-divinyltetramethyldisiloxane, hexavinyldisiloxane, 1,3-divinyltetraphenyldisiloxane, 1,1,3-trivinyltrimethyldisiloxane, 1,3-dimethytetravinyldisiloxane, and the like. Examples of cyclic alkyl- or arylvinylsiloxanes include 1,3,5-trivinyl-1,3,5-tri-methylcyclotrisiloxane, 1,3,5,7-tetravinyl-1,3,5,7-tetramethylcyclotetrasiloxane, 1,3-divinyloctaphenylcyclopentasiloxane, and the like.

Suitable polyfunctional hydride siloxanes include compositions depicted below:

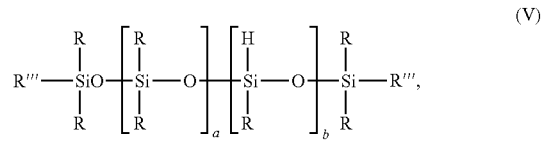

(V)

wherein R is as defined previously, R'" may include R or H, and a and b are defined as above, and selected such that the ratio of b/a allows for at least three reactive Si—H moieties per mole of siloxane of formula (V) above.

Suitable alkyl/hydride cyclosiloxanes are of formula (VI):

[HRSiO]x, (VI)

wherein R is as previously defined, and x is an integer 3 to 18 inclusive.

Other suitable functional hydride siloxanes include:

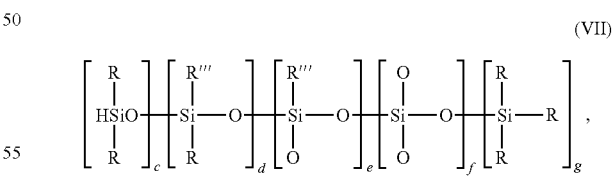

(VII)

wherein R and R'" are as previously defined. In some embodiments, the ratio of the sum of (c+d+e+g)/f is ≥2.

Examples of siloxane hydrides include poly(methylhydrogen)siloxane, poly[(methylhydrogen)-co-(dimethyl)]siloxane; 1,3,5,7-tetramethylcyclotetrasiloxane, 1,3,5,7,9-pentamethylcyclopentasiloxane, and other cyclic methylhydrogen siloxanes; tetrakis(dimethylsiloxy)silane, and organically modified resinous hydride functional silicates corresponding to Formula (VII), with the composition $[HSi(CH_3)_2O_{1/2}]_2 (SiO_2)$.

The siloxane species in the liquid may be selected so as to include at least one alkenyl and hydride siloxane as described above.

Additional terminally functional alkenyl or hydride siloxanes described below in formulas (VIII) and (IX), alone or in combination, may be added to augment the matrix composition in order to adjust the viscosity of the uncross-linked matrix, effect changes in the cured green body hardness, strength and strain, and so on, as would be apparent to those skilled in the art in view of the present disclosure.

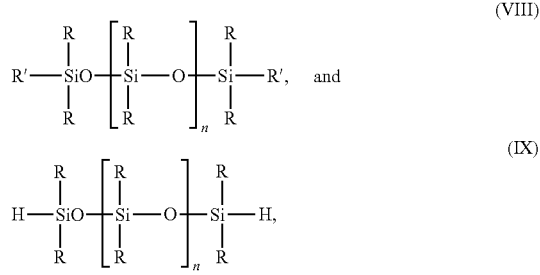

wherein R and R' are as previously defined; and n=0 to 500, in some embodiments 0 to 30, and in particular embodiments 0 to 10.

It should also be apparent that in some embodiments a satisfactory cross-linked network may be effected by combining one component from each of A) a polyfunctional alkenyl or polyfunctional hydride siloxane, as defined in Formulas (II)-(IV) or Formulas (V)-(VII), respectively; and B) a terminally functional alkenyl or hydride siloxane as defined in Formulas (VIII) or (IX) respectively, restricted only such that the composition contains both an alkenyl and a hydride functional species to allow cross-linking between the complementary alkenyl and hydride reactive functional groups.

The viscosity of the liquid binder, its theoretical cross-link density, and resultant silica char yield may be adjusted using the appropriate siloxane species and the stoichiometric ratio of total hydride to alkenyl reactive functional groups. For instance, the viscosity of the composition can vary from about 1 to about 6000 centistokes, in some embodiments from about 1 to about 300 centistokes, and in particular embodiments from about 1 to about 100 centistokes. The theoretical cross-link density, as represented by the number average molecular mass of the shortest formula repeat unit distance between reactive hydride or alkenyl functional cross-link sites (abbreviated for the purposes of this description as $MW_c$,), can vary in some embodiments from about 30 to about 4,100 g/mole, in some embodiments from about 30 to about 500 g/mole, and in particular embodiments up to about 150 g/mole. In other embodiments, such as embodiments in which the binder includes a siloxane polymer, the $MW_c$ can be much higher, such as, for example, up to about 35,000 g/mole. In some embodiments, the $MW_c$ is in the range from about 10,000 g/mole to about 35,000 g/mole. Such comparatively high $MW_c$ binders, when processed in accordance with the techniques described herein, may result in a softer, more compliant material with higher strain to failure (in the green to dried state) and with lower cure shrinkage than with lower $MW_c$ binders. To produce a suitably hard and resilient cured material, the hydride to alkenyl molar ratio is generally in the range from about 0.5 to 3, in some embodiments in the range from about 0.5 to 2, and particular embodiments in the range from about 1.0 to 1.75. In the particular case of 1,3,5,7-tetramethylcyclotetrasiloxane and 1,3,5,7-tetravinyl-1,3,5,7-tetramethylcyclotetrasiloxane, combinations in molar ratios from 0.5 to 2 give silica yields upon pyrolysis of the cured matrix at 1,000° C. in air from 74 to 87% of the original mass.

In some embodiments, the wt % of siloxane in the slurry relative to the total alumina+siloxanes is between 10 wt % and 32.4 wt %. In some embodiments, the wt % of siloxane in the slurry relative to the total alumina+siloxanes is between 10 wt % and 25 wt %. In other embodiments, the wt % of siloxane in the slurry relative to the total alumina+siloxanes is between 10 wt % and 20 wt %. In still other embodiments, the wt % of siloxane in the slurry relative to the total alumina+siloxanes is between 15 wt % and 25 wt %. In some embodiments, the wt % of siloxane in the slurry relative to the total alumina+siloxanes is between 15 wt % and 20 wt %. In other embodiments, the wt % of siloxane in the slurry relative to the total alumina+siloxanes is between 12 wt % and 18 wt %. In other embodiments, the wt % of siloxane in the slurry relative to the total alumina+siloxanes is between 20 wt % and 30 wt %, or between 25 wt % and 30 wt %.

Other additives that may be present in the slurry include, but are not limited to, aluminum, yttrium, hafnium, yttrium aluminate, rare earth aluminates, colloidal alumina, oxides of aluminum, yttrium, hafnium, magnesium, and/or zirconium for increasing refractory properties of the shell mold or core composition. In addition, dispersants, such as stearic or oleic acid, may be added. Other constituents, such as fugitive materials which are removed during firing to produce porosity in the core, may also be included. For purposes of this disclosure, a fugitive material is an organic material that is combustible under the high-temperature firing disclosed herein; the resulting gases or volatile liquids will leave the fired body and do not remain. Examples of such fugitive materials include, but are not limited to, polyolefin (e.g., polyethylene, polypropylene, polystyrene) spherical beads, and graphite or glassy carbon powders.

This slurry is then transferred, before hardening due to cross-linking, into a die of desired shape for the resulting ceramic core. Traditional metal dies or disposable thin wall core die technology (DCD), such as that described in U.S. Pat. No. 7,487,819 (disclosed herein by reference in its entirety), may be used for this process, as may injection molding or any other type of conventional molding. In some embodiments, the slurry is transferred into a disposable core die.

Once the slurry is transferred into the die, the slurry may be cured to form a solidified article, that is, a green body. In some embodiments, the temperature for curing is between 25° C. and 110° C. In other embodiments, the temperature for curing is between 40° C. and 80° C. In still other embodiments, the temperature for curing is between 50° C. and 70° C. In yet other embodiments, the temperature for curing is between 55° C. and 65° C. In some embodiments, the time for curing is between 1 hour and 24 hours. Any time and temperature combination that will cure the slurry to a green body is acceptable. As a non-limiting example, the curing step may be approximately two hours at 50° C. As another non-limiting example, the curing step may be approximately 24 hours at 35° C.

In some embodiments, the conversion occurs in a two-step firing process. The first low-temperature firing step converts the silicon in the siloxane binder to amorphous silica. This "low fire" step, in some embodiments, burns off the die. In some embodiments, the first step is performed for between 10 and 20 hours. In some embodiments, the first step is performed for between 12 and 18 hours. In other embodiments, the first step is performed for approximately 16 hours. In some of these embodiments, the first temperature is between 250° C. and 750° C., or the first temperature is between 350° C. and 650° C. In other embodiments, the first temperature is between 400° C. and 600° C., or the first temperature is between 450° C. and 550° C.

The core then undergoes further heat treatment (i.e., a high-temperature firing). In this step, the amorphous silica in combination with the excess alumina is converted to mullite. In some embodiments, the temperature for this conversion is between 1050° C. and 1700° C., or between 1150° C. and 1650° C., or between 1200° C. and 1650° C. In some embodiments, the temperature for this conversion is between 1400° C. and 1650° C., or the temperature for this step is between 1450° C. and 1650° C. In still other embodiments, the temperature for this step is between 1500° C. and 1650° C., or the temperature for this step is between 1500° C. and 1600° C. In some embodiments, the temperature for this conversion is between 1550° C. and 1650° C., or the temperature for this conversion is between 1575° C. and 1625° C. In other embodiments, the temperature for this conversion is between 1400° C. and 1600° C., or the temperature for this conversion is between 1450° C. and 1600° C. In yet other embodiments, the temperature for this conversion is between 1550° C. and 1600° C. In some embodiments, the time utilized for this conversion is between one hour and 24 hours. In some embodiments, the time utilized for this conversion is between one hour and 12 hours. In some embodiments, the time utilized for this conversion is between one hour and 6 hours. In some embodiments, the time utilized for this conversion is one hour. Any time and temperature combination that will maximize the conversion of the amorphous silica-containing core to a mullite-containing ceramic core as described herein is acceptable.

In some embodiments, there may be three separate heating events used for this procedure. In the first heating event, the slurry is cured to form a green body. The second heating event is the low fire step described above. The third heating event is the conversion of silica in the presence of excess alumina to mullite. In some embodiments, the curing and firing steps may be accomplished in a single furnace in a single run. In other embodiments, the firing steps may be accomplished in a single furnace in a single run.

The formed ceramic core comprises mullite, alumina, and free silica. Free silica may be present in the ceramic core, but much of this silica is encapsulated by mullite, rendering it "hidden" (or "substantially non-reactive") from the metal, not available for reaction with metal alloy, functionally inert, and compatible with casting of reactive alloys. This microstructure is demonstrated in FIG. 1 (described more fully below). There may be some free silica present in the ceramic core that is potentially reactive, but these amounts should be minimal. In some embodiments, the ceramic core contains up to 11 wt % free silica, or the ceramic core contains up to 10 wt % free silica, or the ceramic core contains up to 8 wt % free silica. In some embodiments, the ceramic core contains up to 6 wt % free silica, or the ceramic core contains up to 3 wt % free silica. In some embodiments, the ceramic core contains up to 1 wt % free silica. In some embodiments, the ceramic core contains between 0.1 wt % and 10 wt % free silica. In other embodiments, the ceramic core contains between 0.1 wt % and 5 wt % free silica, or between 0.1 wt % and 6 wt % free silica. In still other embodiments, the ceramic core contains between 1 wt % and 10 wt % free silica. In some embodiments, the ceramic core contains between 1 wt % and 5 wt % free silica, or between 0.1 wt % and 3 wt % free silica. In yet other embodiments, the ceramic core contains between 1 wt % and 3 wt % free silica, or the ceramic core contains between 0.5 wt % and 1 wt % free silica. In some embodiments, the ceramic core contains between 2 wt % and 8 wt % free silica. In still other embodiments, the ceramic core contains between 3 wt % and 6 wt % free silica. In other embodiments, the ceramic core contains between 0.1 wt % and 1 wt % free silica.

For purposes of this disclosure, the majority of the silicon-containing constituents initially present in the slurry in the form of siloxane binders are converted to the silicon-containing ceramic phase mullite. However, it is to be understood that the thermally-converted slurry may also include other materials, such as silica, other $Al_2O_3$—$SiO_2$ polyforms, and/or alumina. The remaining free silica may be encapsulated by the formed mullite, rendering it non- or minimally-reactive for subsequent casting steps.

As mentioned above, yttrium (or another reactive metal) can react with silica during casting, forming an oxide of the metal (such as yttria) and silicon. The silicon can redissolve in the alloy, leading to remelt during subsequent solid-solutioning heat treatment of the alloy and a debit in mechanical properties. However, in the present disclosure, there is little free silica available, and at least a portion of the free silica present is sequestered by mullite, rendering it unavailable to react with the metal. Additionally, applying an oxide on the surface of the ceramic core further minimizes the reaction between silica and metal at the core-metal interface. For purposes of this disclosure, the term "an oxide" may mean any one of the following possibilities, unless otherwise specified: 1) a single oxide applied in a single coating; 2) a single oxide applied in multiple coating steps; 3) multiple oxides (i.e., a mixture) applied in a single coating; or 4) multiple oxides applied in multiple coatings, which would include a) the application of one oxide mixture in multiple coating steps, or b) the application of one type of oxide (or mixture), followed by the application of a different oxide (or mixture), and repeated, if desired. In some embodiments, the oxide application occurs after the first firing process. In other embodiments, the oxide application occurs after the final firing process. In some embodiments, the method further includes applying an oxide on substantially the entire surface of the ceramic core. "Substantially the entire surface" indicates that, while it may be preferable to have all surfaces of the ceramic core that are exposed to reactive metal applied with oxide, it may be that small percentages of the surface do not have oxide present.

Metal oxide core materials can be susceptible to reaction with more active metals in the electromotive series, that is, metals that are more easily oxidized. General forms of the reaction of a metal M with silicon dioxide core material, depending on the possible oxidation states of M are:

$$M + SiO_2 \rightarrow MO_2 + Si \quad (1)$$

$$M' + 3/2 SiO_2 \rightarrow M'_2O_3 + 3/2 Si \quad (2)$$

These reactions produce an oxide scale comprising M at the interface, and generate Si which can dissolve into the metal or alloy, or further react to form other species. The tendency for reactions such as 1 or 2 proceed depends on the thermodynamic stability of the resultant metal oxides.

Figure 2:
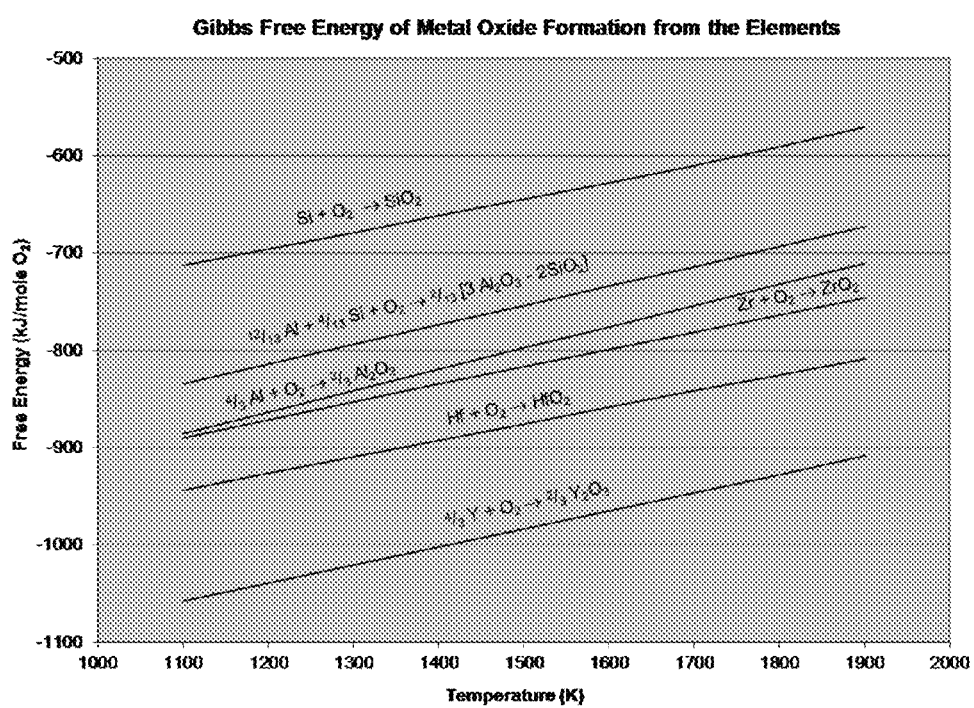
FIG. 2 shows the $\Delta G_f$ normalized to the common reactive species, $O_2$, for several metal oxides, plotted as a function of temperature, in the form of an Ellingham-type diagram.

A convenient way to quantify this reactivity is the Gibbs free energy change for the reaction in question, $\Delta G_r$. The Gibbs free energy of reaction is simply defined as the maximum work that can be extracted from a chemical system at a specific constant temperature and pressure. By convention, processes with $\Delta G_r$<0, are spontaneous under the indicated conditions. A special case of Gibbs free energy of reaction is termed the Gibbs free energy of formation, $\Delta G_f$. $\Delta G_f$ is defined as the free energy change for a reaction for the production of 1 mole of substance from the elements, all in their standard, lowest energy forms, at 1 atm pressure. Values for $\Delta G_f$ of many metal oxides are known and have been measured as a function of absolute temperature (for example, in Barin, et al., "Thermochemical Data of Pure Substances Parts I and II", VCH Publishers, New York, $2^{nd}$ ed., 1993). FIG. 2 shows the $\Delta G_f$ for several metal oxides, plotted as a function of temperature and normalized to the common reactive species, $O_2$, in the form of an Ellingham-type diagram. Table 1 lists the $\Delta G_f$ of several metal oxides normalized to one mole of $O_2$, at 1800 K.

Table 1. Energetics of Formation of Ceramic Oxides from the Elements $4/3Y+O_2\rightarrow 2/3Y_2O_3$ $\Delta G_f$ at 1800 K=-928 kJ/mole $O_2$ $Hf+O_2\rightarrow HfO_2$ $\Delta G_f$ at 1800 K=-825 kJ/mole $O_2$ $Zr+O_2\rightarrow ZrO_2$ $\Delta G_f$ at 1800 K=-764 kJ/mole $O_2$ $4/3Al+O_2\rightarrow 2/3Al_2O_3$ $\Delta G_f$ at 1800 K=-732 kJ/mole $O_2$ $12/13Al+4/13Si+O_2\rightarrow 2/13[3\,Al_2O_3\text{-}2SiO_2]\Delta G_f$ at 1800 K=-693 kJ/mole $O_2$ $Si+O_2\rightarrow SiO_2$ $\Delta G_f$ at 1800 K=-590 kJ/mole $O_2$ From a consideration of the normalized $\Delta G_f$ values, it can be seen that the order of metal oxide stability is $Y_2O_3$>$HfO_2$>$ZrO_2$>$Al_2O_3$>$3Al_2O_3$-$2SiO_2$>$SiO_2$. $Y_2O_3$ is the most stable, because its normalized Gibbs free energy of formation is the most negative in comparison with oxides of the other elements. The trends displayed above are important in the context of additional process steps to coat the core with a metal oxide, limiting contact between yttrium or other reactive element in the alloy and any free silica near the surface. Any metal oxide with a normalized $\Delta G_f$ more negative than that of $SiO_2$ at the same temperature, will have a lesser thermodynamic driving force for reaction, and may be employed for this purpose. As an example, in a metal casting process conducted at 1800 K, any metal oxide with a normalized $\Delta G_f$ less than -590 kJ/mole $O_2$, will be less reactive than $SiO_2$ at 1800 K. It is important to note that the relative reactivity is based on the normalized $\Delta G_f$ to the common reactive species $O_2$.

Further, addition of a particulate layer at the surface of a porous ceramic core, comprising a metal oxide with a more negative $\Delta G_f$ than $SiO_2$, introduces a physical barrier, as well as having a lower thermodynamic tendency to undergo reaction. This has several benefits. For example, the coating layer may be less reactive, leading to the generation of less metal oxide at the core-metal interface. The coating layer may also reduce the rate at which the base ceramic core material is reduced by introducing transport or kinetic limitations.

$Y_2O_3$ is a coating that works well in this disclosure, since in the case of yttrium oxide particles on a core containing free silicon dioxide, cast against an alloy containing yttrium, yttrium metal in the alloy would not react with the yttrium oxide particles. This is because there would be no net chemical change and the net free energy change would be zero. A coating of yttrium oxide particles could also act as a physical barrier reducing access of the yttrium to the underlying silicon dioxide core material.

The oxide may be added to the surface of the ceramic core in a number of different ways. In some embodiments, the addition is accomplished by dip coating the ceramic core in a solution or suspension of an oxide precursor, such as a salt of yttrium, zirconium, or aluminum. In other embodiments, the ceramic core is dip coated in a colloidal suspension or a metal salt solution; in one embodiment the salt is a nitrate salt. In still other embodiments, the ceramic core is dip coated in a colloidal oxide suspension. In some embodiments, the ceramic core is dip coated in a colloidal suspension containing yttria. In yet other embodiments, the ceramic core is dip coated in a colloidal suspension containing zirconia. In still other embodiments, the ceramic core is dip coated in a colloidal suspension containing alumina. In other embodiments, the addition is accomplished by spraying a solution or suspension of the oxide onto the surface of the ceramic core. In other embodiments, the addition is accomplished by brushing a solution or suspension of the oxide onto the surface of the ceramic core. In still other embodiments, the ceramic core is sprayed or brushed with a colloidal oxide suspension. In some embodiments, the ceramic core is sprayed or brushed with a colloidal suspension containing yttria. In other embodiments, the ceramic core is sprayed or brushed with a colloidal suspension containing zirconia. In some embodiments, the ceramic core is sprayed or brushed with a colloidal suspension containing alumina.

In some embodiments, subsequent process steps, such as a re-firing or heating for casting, may cause a reaction to occur between an applied species (e.g., yttria) and something present on the surface of the core. As an example, if a colloidal yttria solution is utilized to deposit a continuous coating of yttria on the surface of the ceramic core, the yttria may end up with reacting with a reactant present on the surface. If, for instance, silica or alumina is present on the surface of the ceramic core, the addition of the yttria coating may cause an yttrium silicate or an yttrium aluminum oxide to be formed in a subsequent heating step (but prior to a metal pour step). In some embodiments, therefore, the yttrium oxide applied on the surface of the ceramic core may become an yttrium silicate or an yttrium aluminum oxide. In other embodiments, the oxide may be yttria. In some embodiments, the oxide may be alumina. In these embodiments, the alumina may react with exposed silica to form mullite. Combinations of oxides may also be present in some embodiments.

The disclosure further relates to a method of making a cast metal article. The method includes obtaining a ceramic core comprising mullite, alumina, and up to 11 wt % free silica. In some embodiments, an oxide is disposed on substantially the entire surface of the ceramic core. The oxide has a normalized Gibbs free energy of formation that is less than the normalized Gibbs free energy of formation for silica. A ceramic core with this mullite-alumina composition, along with oxide application on the surface of the core, permits the use of reactive metal-bearing alloys during investment casting. Molten reactive metal is then brought into contact with the ceramic core, for instance, by using a mold, and the reactive metal is solidified.

In some embodiments, the reactive metal is an alloy comprising nickel, cobalt or iron. In other embodiments, the reactive metal further comprises yttrium (Y), hafnium (Hf), tungsten (W), tantalum (Ta) or aluminum (Al). In yet another embodiment the reactive metal is an alloy is a single crystal or directionally solidified superalloy.

The disclosure further relates to a ceramic core formed by a method disclosed herein. Briefly, the ceramic core is formed by obtaining a slurry which includes alumina particles and a siloxane binder, and converting a portion of the slurry to mullite by thermal treatment. The ceramic core includes mullite, alumina, and up to 11 wt % free silica. In some embodiments, an oxide is disposed on substantially the entire surface of the ceramic core. The oxide has a normalized Gibbs free energy of formation that is less than the normalized Gibbs free energy of formation for silica.

The disclosure further relates to a cast metal article formed by bringing molten reactive metal into contact with a ceramic core which includes mullite, alumina, and up to 11 wt % free silica. The metal is then solidified. In some embodiments, the ceramic core has an oxide disposed on substantially its entire surface. In some embodiments, the oxide has a normalized Gibbs free energy of formation that is less than the normalized Gibbs free energy of formation for silica.

There are many benefits to using the disclosed processes and ceramic cores. These thin wall disposable core dies also allow for more complex structures to be produced. The slurries and processes of the current disclosure are compatible with already-existing DCD processes to generate structures of complex geometry for the casting of reactive alloys that are not able to be made with conventional molding. The disclosure provides compatibility with DCD processes for fabrication of ceramic cores, including the capability to fabricate complex core shapes with concomitant process times and yields. The slurry system also allows for near net shape capability, limiting the necessity of post-cast finishing.

EXAMPLES

The examples presented herein are intended to be merely illustrative, and should not be construed to be any sort of limitation on the scope of the claimed disclosure. Unless specified otherwise, all of the components are commercially available from common chemical suppliers.

Example 1

Table 2 below lists the measured alumina particle sizes and weight percents mixed together to form the alumina portion of the slurry of Example 1:

TABLE 2

| Example 1 Alumina Powder Blend | |
|---|---|
| Alumina D50 (microns) | Wt % |
| 44.5 | 25.2 |
| 17.3 | 27 |
| 9.3 | 1.8 |
| 6.4 | 36 |
| 5.9 | 10 |

This alumina mixture was combined with a reactive siloxane mixture at 55 vol % $Al_2O_3$ loading to form the desired slurry. The reactive siloxanes were 1,3,5,7-tetravinyl 1,3,5,7-tetramethylcyclotetrasiloxane (also known in the art as $D4^{Vi}$) and a hydride-functional organosilicate resin (CAS registry number 68988-57-8, corresponding to Formula (VII) with the nominal composition $[HSi(CH_3)_2O_{1/2}]_2$ ($SiO_2$), also known in the art as an $M^HQ$ resin). The mass ratio of the reactive siloxanes was maintained to give an approximately 1:1 Si—H to vinyl molar ratio.

| Example 1 Slurry Composition | | | |
|---|---|---|---|
| Alumina blend | 437.80 | 82.74 | 55 |
| Siloxane mixture | 91.35 | 17.26 | 45 |
| | grams | wt % | volume % |

Karstedt's platinum catalyst (50 ppmw w/r to the siloxane content, as Pt) was also added to the slurry to cross-link it to a solid form in a subsequent curing step, helping to preserve the integrity of the shape of the molded form. The slurry was then injected into a thin-wall, organic polymeric disposable core die.

The filled disposable core die was then cured at 50° C. for 15 hours to form a solidified green body. A low fire step with a terminal temperature of 500° C. for twelve hours was then performed in an air atmosphere in order to burn off the die and pyrolyze the siloxane present in the green body to amorphous silica in the low-fired core.

Figure 3:
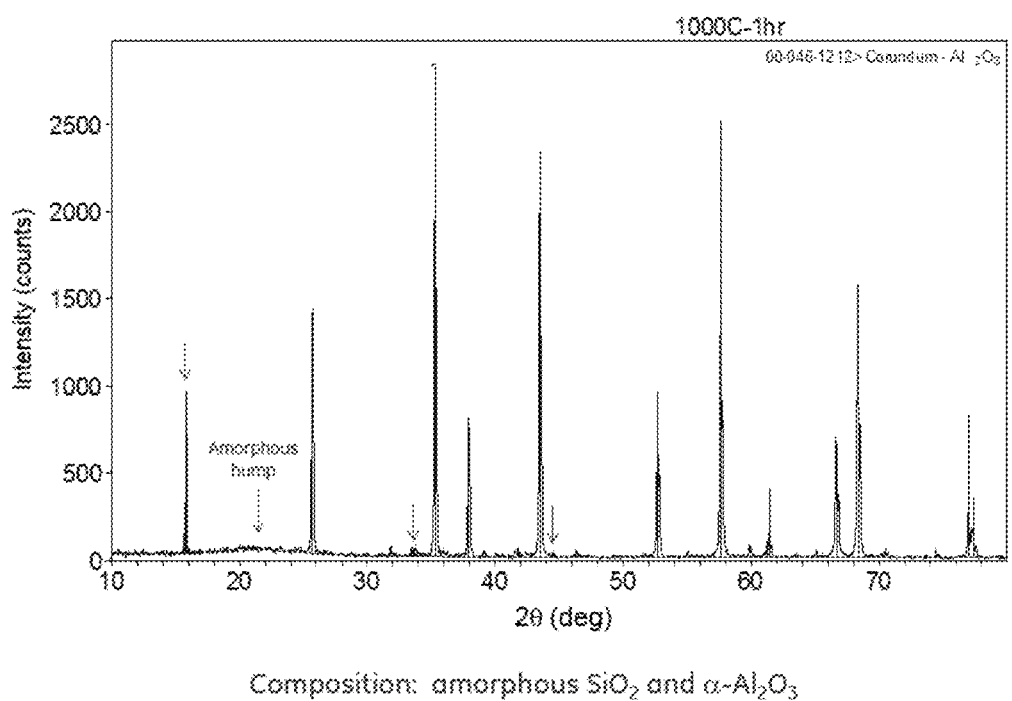
FIG. 3 shows an X-ray diffraction pattern of one embodiment of the invention fired at 1000° C. for one hour.
Figure 4:
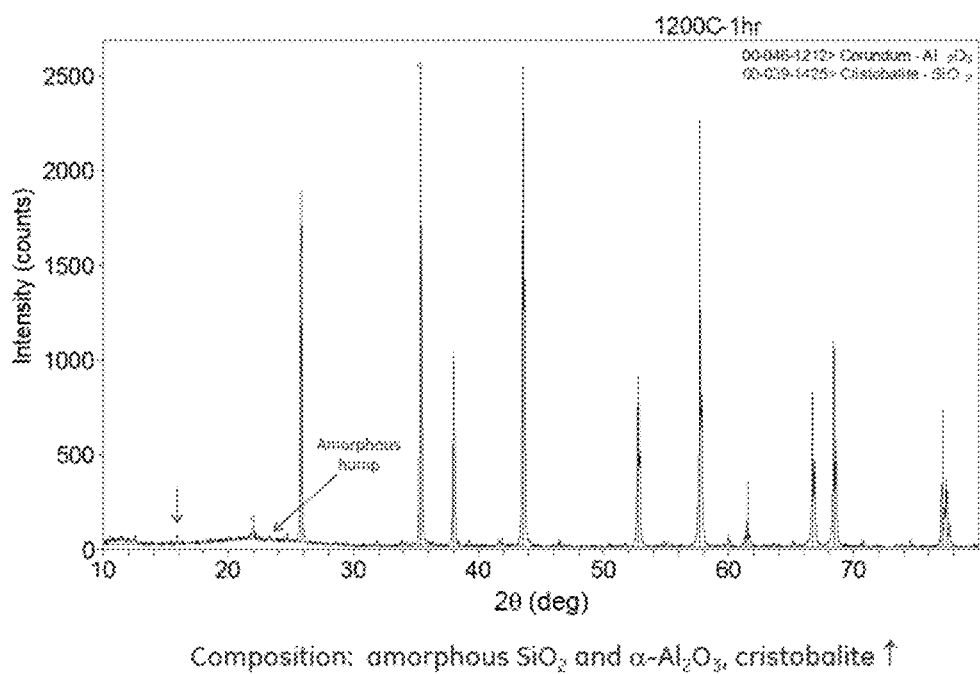
FIG. 4 shows an X-ray diffraction pattern of one embodiment of the invention fired at 1200° C. for one hour.
Figure 5:
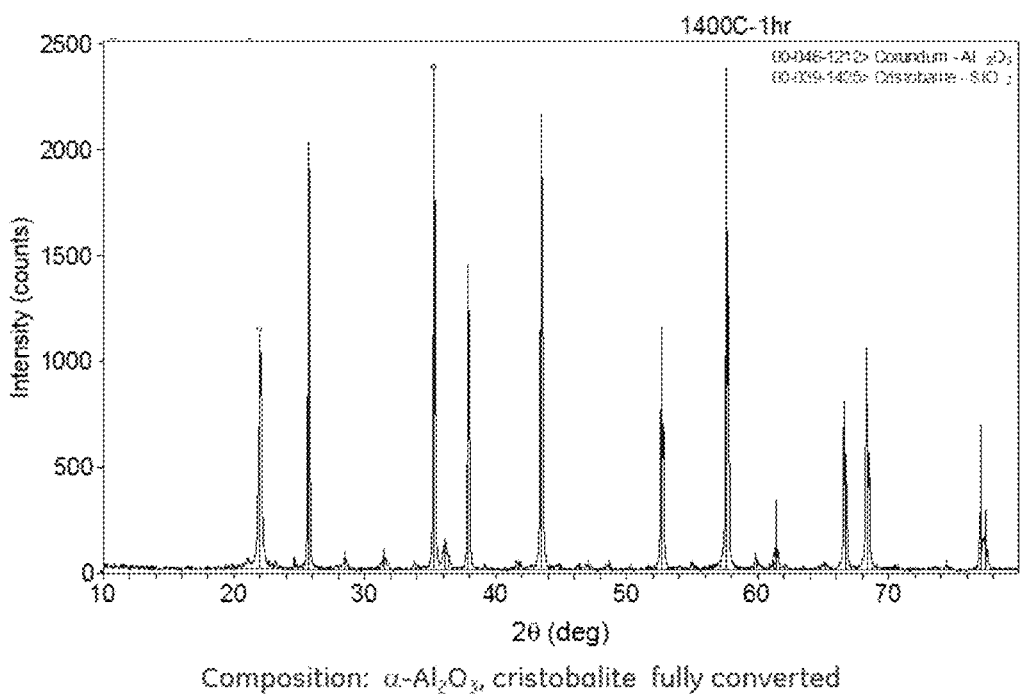
FIG. 5 shows an X-ray diffraction pattern of one embodiment of the invention fired at 1400° C. for one hour.
Figure 6:
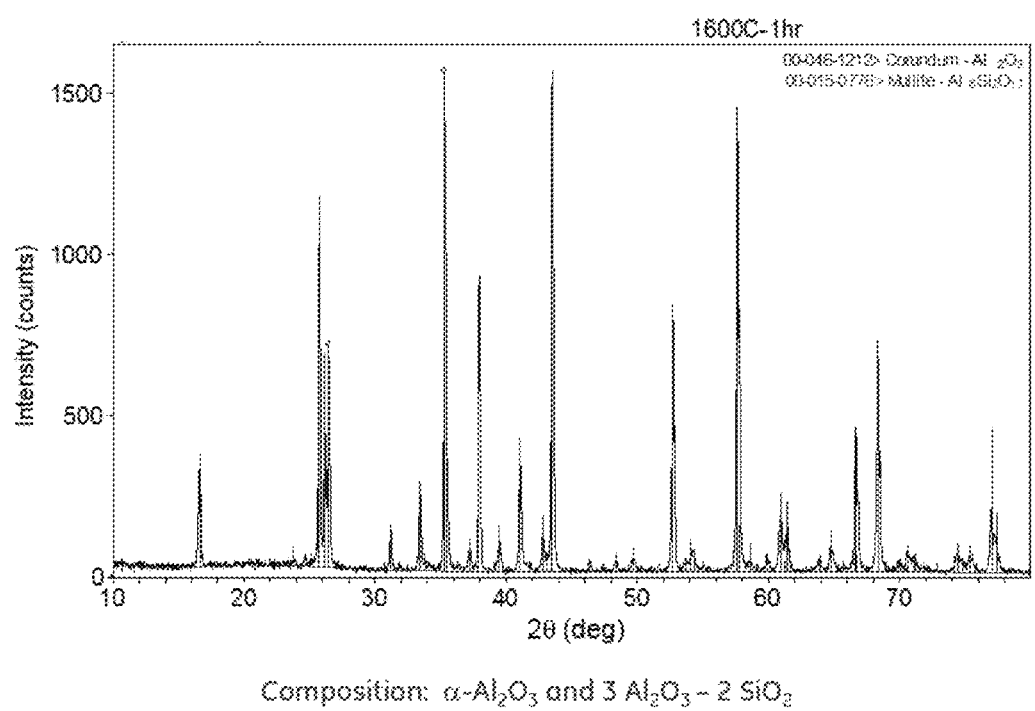
FIG. 6 shows an X-ray diffraction pattern of one embodiment of the invention fired at 1600° C. for one hour.

Finally, a high-fire step was performed on the low-fired core. The low-fired pieces were separately fired in air for one hour at each of the following temperatures: 1000° C., 1200° C., 1400° C., and 1600° C. The results of the changes to the composition of the low-fired core at these different temperatures are shown in the X-ray diffraction patterns of FIGS. 3-6, respectively. FIG. 3 shows the X-ray diffraction pattern of the ceramic core when the heating was performed at 1000° C. The composition of the resultant core is comprised of amorphous $SiO_2$ and corundum $\alpha$-$Al_2O_3$. The X-ray diffraction pattern when the firing temperature was 1200° C. (FIG. 4) demonstrates that the composition still includes amorphous $SiO_2$ and corundum $\alpha$-$Al_2O_3$, but also shows some transformation of the amorphous silica by devitrefication into the high-temperature-stable crystalline silica form, cristobalite. FIG. 5 represents the X-ray diffraction pattern at 1400° C., and shows that corundum $\alpha$-$Al_2O_3$ is present, as well as increased amounts of cristobalite. The only detectable silica form at this stage is cristobalite. There also may be small amounts of amorphous silica present, but these were not detectable by XRD. Finally, FIG. 6 shows the X-ray diffraction pattern when the heating was performed at 1600° C. for one hour. As can be seen, the composition of the ceramic core is corundum $\alpha$-$Al_2O_3$ and mullite (3 $Al_2O_3$-2 $SiO_2$). It is to be noted that there may still be some free silica present under these conditions, but the X-ray diffraction is not sensitive enough to show it. The $^{29}$Si-NMR spectrum (described below in Example 3), however, confirms the presence of free silica; the free silica content is 6% wt.

The change in phase composition from low- to high fire is shown below:

| Example 1 Ceramic Body Composition | | |
|---|---|---|
| Ceramic Phase | After low-fire | After high-fire (1600° C., 1 hr) |
| alumina | 85 | 63 |
| silica | 15 | 6 |
| mullite | 0 | 31 |
| Total | 100 wt % | 100 wt % |

Four separate rectangular test bars were fabricated of the same slurry and fired according to the conditions above, with high fire at 1600° C. for 1 hr. The following properties were measured: open pore fraction, room-temperature bend strength, and linear firing shrinkage. The values of various resulting characteristics are shown below in Table 3:

TABLE 3

| Sample ID | Total Mold-to-Fired Linear Shrinkage % | MOR 4-pt bend 25° C. | Open Porosity Vol % |
|---|---|---|---|
| a | 1.03 | 5300 | 21.3 |
| b | 1.18 | 5000 | 21.6 |
| c | 1.11 | 4600 | 21.8 |
| d | 0.88 | 4700 | 22.2 |
| Mean | 1.05 | 4900 | 21.7 |
| Std Dev | 0.13 | 300 | 0.39 |
| 95% CI | 0.21 | 500 | 0.63 |

These parameters are within the ranges of acceptability for core materials currently used in precision investment casting of gas turbine airfoils.

FIG. 1 is a spectral image obtained using electron microscopy showing elemental distribution of the encapsulation of free silica described herein. The Si—Al map shows that three primary phases are present (labeled on figure): The regions designated "1" are corundum ($\alpha$-$Al_2O_3$), the sections designated "2" are mullite ($3Al_2O_3$-$2SiO_2$), and the sections designated as "3" are amorphous silica ($SiO_2$). The amorphous silica ("3") is generally continuously surrounded by mullite ("2"), as described above.

Figure 7:
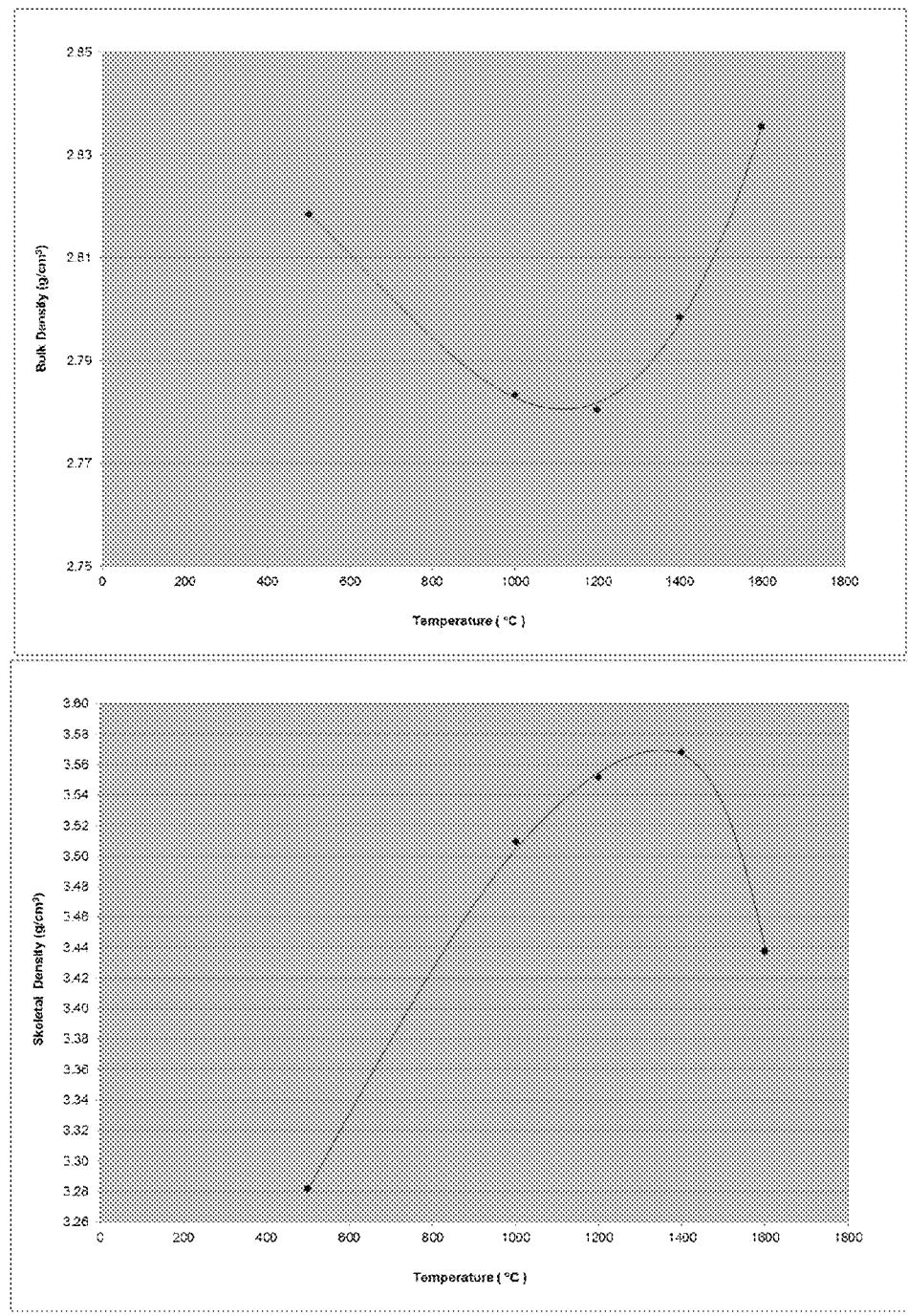
FIG. 7 illustrates the bulk and skeletal density measured at room temperature of an embodiment of the invention following firing at different temperatures.

FIG. 7 illustrates the behavior of the ceramic samples described in Example 1, under in-situ high-fire conditions. A slow fire to 500° C. was performed, then single samples were taken up to 1000° C., 1200° C., 1400° C., and 1600° C. for one hour. Bulk and skeletal density were measured, as shown in the graphs. The graphs show the progress of conversion of alumina+silica to mullite. The bulk density drops due to completion of burnout from 500 to 1000° C., stays essentially constant from 1000-1200° C., then finally starts going back up as the silica undergoes viscous sintering prior to mullite conversion, densification associated with amorphous silica to cristobalite occurs, and the whole body starts sintering overall as the temperature reaches 1600° C. Above 1400° C., the skeletal density starts to decrease, consistent with the formation of the lower density mullite phase and in accordance with the appearance of mullite peaks in the x-ray diffraction pattern above this temperature. At the highest firing temp, 1600° C., the final skeletal density is high (relative to the theoretical density) and indicative of high conversion to mullite. This is consistent with strong walls with minimal closed porosity, which is desirable for investment casting cores.

Example 2

Another example of a composition of the invention is shown below. This composition results in approximately 40 vol % porosity, assuming full mullite conversion and no volume change in the final test bars.

Example 2 Alumina Powder Blend

| Morphology | Alumina D50 (microns) | Wt % |
|---|---|---|
| Angular | 25 | 80 |
| Spherical | 1 | 20 |

This alumina mixture, combined with solid fugitives, was mixed with the reactive siloxane mixture of Example 1 at 52 vol % solids loading to form the desired slurry:

Example 2 Slurry Composition

| | | | |
|---|---|---|---|
| Alumina blend | 729.1 | 72.9 | 40.6 |
| Siloxane mixture | 222.3 | 22.2 | 48 |
| High density polyethylene | 48.6 | 4.9 | 11.4 |
| | grams | wt % | Vol. % |

Solubility tests have been performed on articles resulting from the composition and process of the present disclosure, and these tests demonstrate that leaching rates of these core materials from metallic parts after casting should be comparable to those of alumina core materials currently in practice in the industry. This shows the invention is not just successful at lowering core-metal reactivity, relative to silica-zircon, because it would not be practical or useful to be solely non-reactive if the core could not be readily removed after allowing for a specific hollow shape to be cast.

Example 3

This set of experiments compares the reactivity of four samples listed below in Table 4. Samples 1 and 2 are comparative baselines representing silica-zircon and alumina compositions, respectively. Samples 3 and 4 are embodiments of the invention corresponding to the materials produced in Examples 2 and 1, respectively.

TABLE 4

| Sample ID | Composition | Casting Alloy | Comment |
|---|---|---|---|
| 1A | silica/zircon | Rene' N5 | Comparative baseline |
| 1B | silica/zircon | Rene' N5 w/ 1660 ppm Y | Comparative baseline |
| 2A | alumina | Rene' N5 | Comparative baseline |
| 2B | alumina | Rene' N5 w/ 1660 ppm Y | Comparative baseline |
| 3A | mullite/alumina | Rene' N5 | Comparative baseline |
| 3B | mullite/alumina | Rene' N5 w/ 1660 ppm Y | Embodiment of the disclosure |
| 4 | mullite/alumina/silica | Rene' N5 w/ 1660 ppm Y | Embodiment of the disclosure |

Sample 1 was prepared by mixing silica and zircon powders in the same reactive siloxane mixture as in Example 1, injecting into a plastic mold, curing the siloxane, and heating the sample in a furnace to convert the material into a porous sintered silica/zircon body.

Sample 2 was prepared by mixing the alumina blend of Table 2 (with additional yttria, MgO, and glassy carbon) powders in an acrylate binder at a total of 60 vol % solids loading, injecting into a plastic mold, curing the binder, and heating the sample in a furnace to convert the material into a porous sintered body, consisting mainly of alumina, but also containing small amounts of spinel ($MgAl_2O_4$) and yttrium alumina garnet (YAG, $Y_3Al_5O_{12}$), as a result of reaction between the alumina and MgO or $Y_2O_3$, respectively, during firing. This formulation closely approximates the fired ceramic phase composition of an industry standard, a representative alumina core (doped with Y and Mg oxides) shown in U.S. Pat. No. 4,837,187.

Samples 3 and 4 were prepared by mixing alumina powders in a siloxane binder to form slurries corresponding to the compositions of Examples 2 and 1, respectively, injecting into a plastic mold, curing the siloxane, and heating the samples in a furnace to convert the materials into porous sintered mullite-containing bodies. Sample 3 was heated to a peak temperature of 1600° C. for 8 hours. Sample 4 was heated to a peak temperature of 1600° C. for 1 hour. X-ray diffraction measurements of Samples 3 and 4 confirmed the presence of crystalline mullite and alumina in both Samples 3 and 4.

Figure 8:
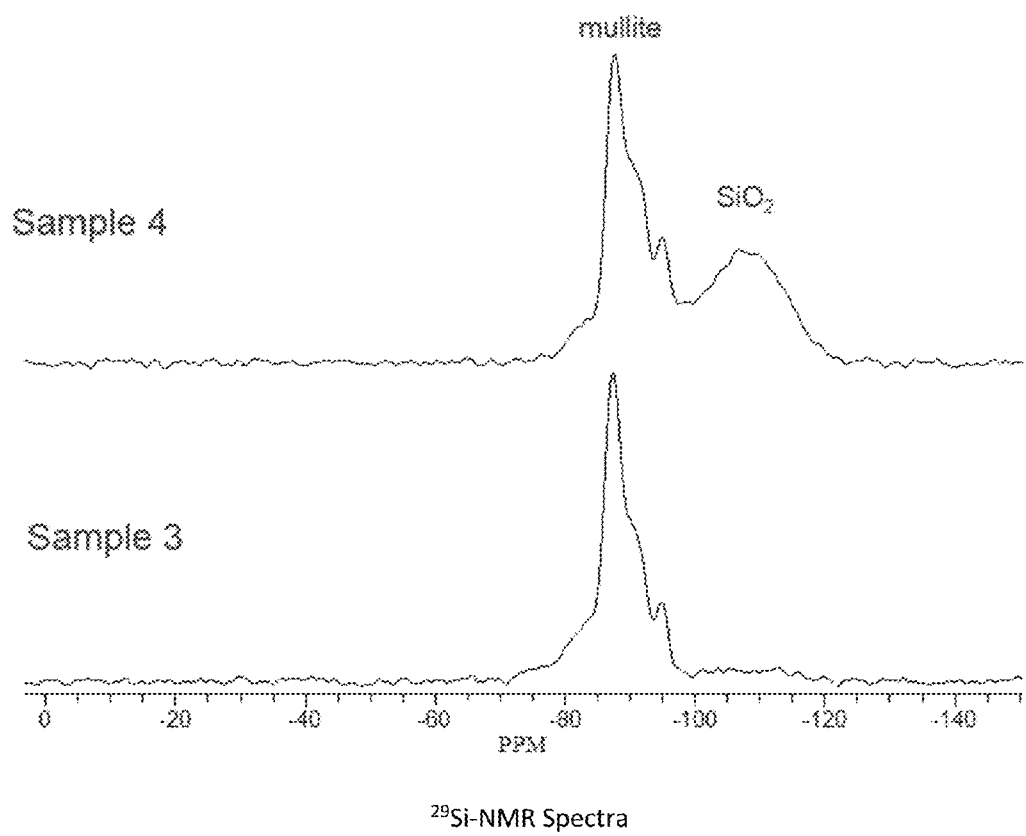
FIG. 8 shows Bloch decay, solid-state, magic angle spinning $^{29}Si$ nuclear magnetic resonance (NMR) spectra of embodiments of the invention.

FIG. 8 shows $^{29}$Si NMR spectra of from material from Samples 3 and 4. This technique is capable of resolving silicon atoms in different chemical environments and quantifying them. Silicon atoms in a silica environment show a signal in the −105 to −115 ppm region. Silicon atoms in a mullite environment show a signal in the −85 to −95 ppm region. From the scans, it is clear that the silica level in Sample 3 is below the detection limit of the $^{29}$Si NMR method, while Sample 4 contains unreacted silica in the mullite/alumina structure. Quantitative analysis of the integrated peak areas in Sample 4 indicates the unreacted silica comprises about 40% of the total signal. Taking the integrated silicon signal to be proportional to the molar contributions from silicon in mullite and free silica, this translates to a free silica content of about 6% wt. Electron microscopy analysis of Sample 3 indicated that small, isolated regions of silica were present, but corresponded to less than about 1% wt of the sample.

The reactivity was tested by casting the samples in Rene' N5 nickel-based superalloys. Baseline tests representing a non-reactive alloy were performed with Rene' N5. Tests were further performed with Rene' N5 with 1660 ppmw of yttrium (Y) added, as an example of a reactive alloy.

Immersion tests were performed in custom-fabricated rectangular 0.5"×0.5"×1.5" high shells with a 1.5"×1.5"×0.09" high base. The facecoat was a zircon slurry with colloidal silica binder (80 mesh alumina stucco, 2 layers). Back-up layers were alumina slurry with colloidal silica (60 grit alumina stucco built to 0.25" thickness). The shell was dewaxed in a steam autoclave and fired in air with a ramp to 1000° C. over 5 hours, a one hour hold at 1000° C. and cooling to room temperature in 5 hours.

In a typical experiment, a piece of core material was wedged into the shell and strips of the metal alloy charge material were placed alongside it. The sample was placed in a resistance-heated directional solidification (DS) furnace with a 3" i.d.×12" long hot zone and with a water-cooled chill plate. The sample temperature was ramped under vacuum to 900° C. in 2 hours. The sample was then backfill purged with argon three times, ramped to 1425° C. in 30 min, held for 5 min, ramped to 1550° C., and held for 5 min to fully melt the liquid charge. After the desired hold time, the sample was then withdrawn at a linear rate of 8"/hour.

Figure 9:
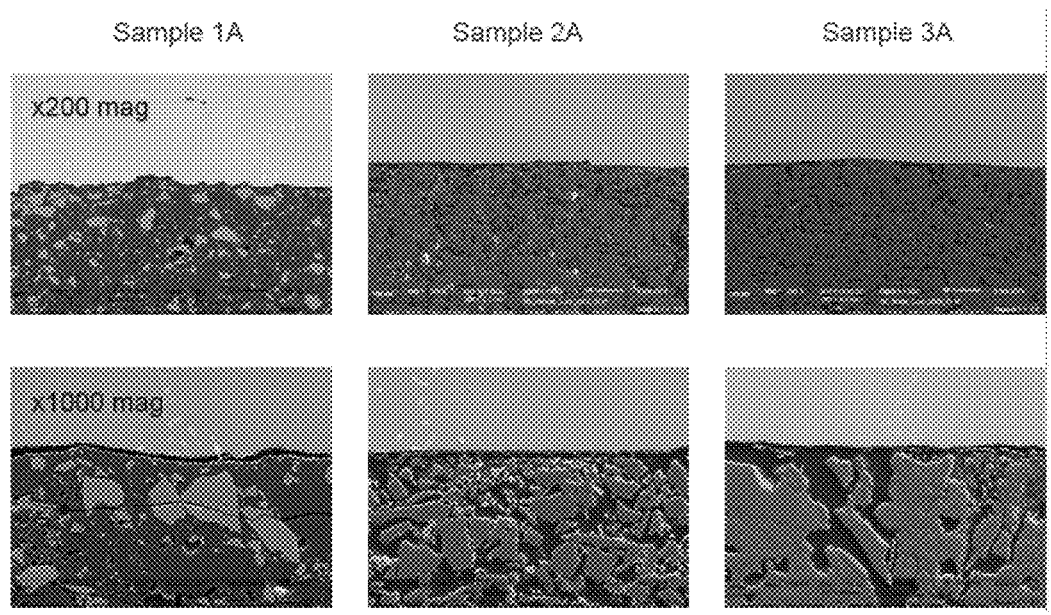
FIG. 9 shows scanning electron microscopy (SEM) images at low and intermediate magnification of comparative examples.

After cooling, the samples were sectioned, mounted and polished, and examined using scanning electron microscopy (SEM). FIG. 9 shows SEM images of Samples 1A, 2A, and 3A at low and intermediate magnification. A relatively smooth, feature-free interface exists between the alloy (top, light gray) and the core (bottom) regions. This illustrates the absence of significant reaction zones for all three of these core materials, in the absence of yttrium additives in the alloy.

Figure 10:
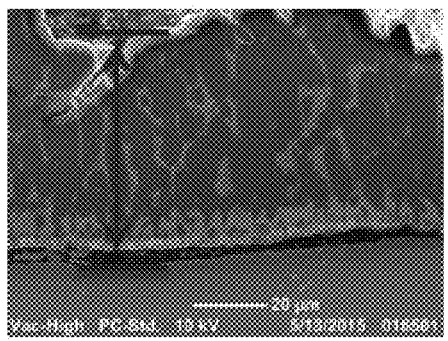
FIG. 10 shows intermediate magnification SEM micrographs of comparative examples and an embodiment of the invention.
Figure 10:
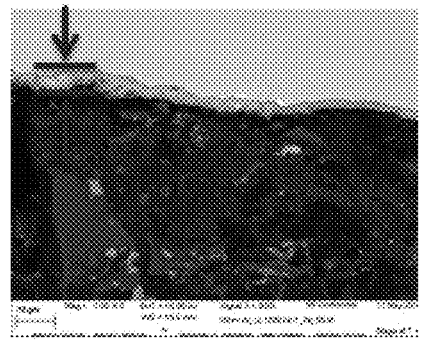
Figure 10:
Figure 10:
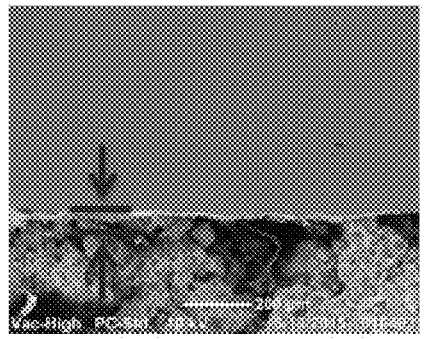

FIG. 10 shows intermediate magnification SEM micrographs of samples 1 to 4 cast with Rene' N5 containing 1660 ppmw of yttrium. A marked contrast can be seen in the silica samples, with Sample 1B having a large reaction zone between the alloy and the core. In the image for Sample 1B, the alloy is at the bottom of the image and the edge of the core region can be seen at the top of the image. Samples 2B, 3B, and 4 all show a thinner reaction zone, with average thicknesses of about 10 micrometers or less. This thinner reaction zone shows that these materials exhibit significantly less reactivity than the silica baseline. Further, the results in Sample 4 show that it is possible to achieve similar levels of reactivity performance, despite the presence of 6% wt unreacted free silica in the core body.

While several aspects of the present disclosure have been described and depicted herein, alternative aspects may be effected by those skilled in the art to accomplish the same objectives. Accordingly, it is intended by the appended claims to cover all such alternative aspects as fall within the true spirit and scope of the disclosure.

The present disclosure has been described in terms of some specific embodiments. They are intended for illustration only, and should not be construed as being limiting in any way. Thus, it should be understood that modifications can be made thereto, which are within the scope of the disclosure and the appended claims. Furthermore, all of the patents, patent applications, articles, and texts which are mentioned above are incorporated herein by reference.

We claim:

1. A method, comprising:
   injecting a slurry comprising alumina particles and a siloxane binder into a die wherein the wt % of alumina in the slurry relative to the total weight of alumina and siloxane is from 67.6 wt % to 90 wt %; and
   thermally converting said slurry into a ceramic core at a temperature from 1050° C. to 1700° C.,
wherein said ceramic core comprises mullite, alumina, and up to 11 wt % free silica.

2. The method according to claim 1, wherein said thermally converting occurs at a temperature of between 1400° C. and 1700° C.

3. The method according to claim 1, wherein said ceramic core contains between 0.1 wt % and 6 wt % free silica.

4. The method according to claim 1, further comprising applying an oxide on substantially the entire surface of the ceramic core, wherein said oxide has a normalized Gibbs free energy of formation that is less than the normalized Gibbs free energy of formation for silica.

5. The method according to claim 4, wherein said oxide comprises yttrium, zirconium, or aluminum.

6. The method according to claim 5, wherein said oxide is selected from at least one of yttrium oxide, yttrium silicate, and yttrium aluminum oxide.

7. The method according, to claim 4, wherein said applying is accomplished by dip coating said ceramic core in a solution or suspension of an oxide comprising yttrium, zirconium or aluminum; or spraying or brushing a solution or suspension of an oxide comprising yttrium, zirconium or aluminum onto the surface of said ceramic core.

8. The method according to claim 4, wherein the oxide comprises yttrium, zirconium, or aluminum.

9. The method according to claim 8, wherein said oxide is selected from at least one of yttrium oxide, yttrium silicate, and yttrium aluminum oxide.

10. The method according to claim 1, wherein said die is a disposable core die.

11. The method according to claim 1, further comprising bringing molten reactive metal into contact with the ceramic core; and solidifying said reactive a petal.

12. The method according to claim 11, wherein the reactive metal is selected from an alloy comprising nickel and yttrium.

13. The method according to claim 11, wherein said ceramic core is formed using a disposable core die.

14. The method according to claim 1, wherein the alumina particles are between 67.6 wt % and 90 wt % of the slurry and the siloxane binder is between 10 wt % and 32.4 wt % of the slurry.

15. The method according to claim 1, wherein the siloxane binder comprises alkenyl siloxanes of the general formula (I):

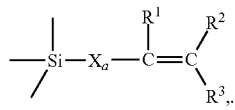
(I)

16. The method according to claim 15, wherein the alkenyl siloxanes are of the general formula (II):

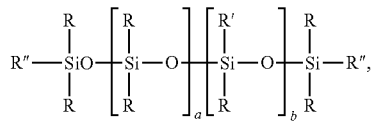
(II)

wherein R is a monovalent hydrocarbon, halocarbon, or halogenated hydrocarbon; and R' is an alkenyl radical such as vinyl, or other terminal olefinic group including allyl or 1-butenyl; R'' includes R or R', a=0 to 200, inclusive, and b=1 to 80, inclusive, wherein a and b provide a fluid with a viscosity of 1,000 centistokes, and a ratio of b/a allows for at least three reactive olefinic moieties per mole of siloxane of formula (II).

17. The method according to claim 16, wherein the alkenyl siloxanes are of the general formula (III):

[RR'SiO]x, (III)

wherein x is an integer 3 to 18 inclusive.

18. The method according to claim 1, wherein the siloxane binder comprises hydride siloxanes of the general formula (V):

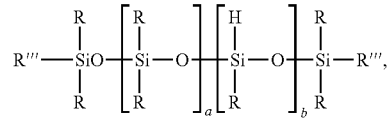
(V)

wherein R is a monovalent hydrocarbon, halocarbon, or halogenated hydrocarbon, R''' may include R or H, a=0 to 200, inclusive, and b=1 to 80, inclusive, and wherein a ratio of b/a allows for at least three reactive Si—H moieties per mole of siloxane of formula (V) above.

19. The method according to claim 1, wherein the siloxane binder comprises at least one of siloxanes of the general formulas (VIII) or (IX);

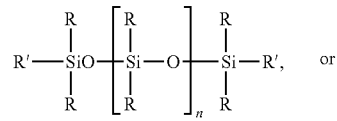
(VIII)

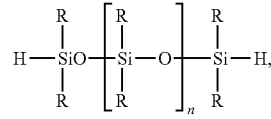
(IX)

wherein R is a monovalent hydrocarbon, halocarbon, or halogenated by and R' is an alkenyl radical such as vinyl, or other terminal olefinic group including allyl or 1-butenyl; and n=0 to 500.

20. The method according to claim 1, further comprising, prior to thermally converting the slurry into the ceramic core, curing the slurry to form a solidified article at a temperature between 25° C. and 110° C.

* * * * *

UNITED STATES PATENT AND TRADEMARK OFFICE
CERTIFICATE OF CORRECTION

PATENT NO. : 9,950,358 B2
APPLICATION NO. : 14/945602
DATED : April 24, 2018
INVENTOR(S) : Xi Yang et al.

Page 1 of 1

It is certified that error appears in the above-identified patent and that said Letters Patent is hereby corrected as shown below:

In the Claims

Column 20, Line 62, "a petal" should be --metal--.

Signed and Sealed this
Twenty-fourth Day of December, 2019

Andrei Iancu
*Director of the United States Patent and Trademark Office*